(12) United States Patent
Holt

(10) Patent No.: US 11,409,521 B2
(45) Date of Patent: *Aug. 9, 2022

(54) HYPERPILER

(71) Applicant: Brian Holt, Incline Village, NV (US)

(72) Inventor: Brian Holt, Incline Village, NV (US)

(73) Assignee: Holtworks, LLC, Incline Village, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/089,721

(22) Filed: Nov. 5, 2020

(65) Prior Publication Data

US 2021/0064362 A1 Mar. 4, 2021

Related U.S. Application Data

(63) Continuation of application No. 16/782,378, filed on Feb. 5, 2020, now Pat. No. 10,853,062.

(60) Provisional application No. 62/879,497, filed on Jul. 28, 2019, provisional application No. 62/870,031, filed on Jul. 2, 2019.

(51) Int. Cl.
*G06F 8/73* (2018.01)
*G06F 8/38* (2018.01)
*G06F 8/34* (2018.01)

(52) U.S. Cl.
CPC ............... *G06F 8/73* (2013.01); *G06F 8/34* (2013.01); *G06F 8/38* (2013.01)

(58) Field of Classification Search
CPC ........... G06F 8/20; G06F 8/30; G06F 8/34–36
See application file for complete search history.

(56) References Cited

U.S. PATENT DOCUMENTS

| | | | | |
|---|---|---|---|---|
| 2003/0221162 | A1* | 11/2003 | Sridhar | G06F 16/972 715/229 |
| 2008/0059950 | A1* | 3/2008 | Seitz | G06F 9/5016 717/108 |
| 2008/0082959 | A1* | 4/2008 | Fowler | G06F 9/44505 717/104 |
| 2014/0365994 | A1* | 12/2014 | Vann | G06F 8/30 717/106 |
| 2014/0380270 | A1* | 12/2014 | Lovisa | H04L 67/567 717/107 |

* cited by examiner

*Primary Examiner* — Duy Khuong T Nguyen
(74) *Attorney, Agent, or Firm* — Clause Eight; Michael Catania

(57) ABSTRACT

A method for an uncontrolled modeling language to be hyperpiled into a general purpose language is disclosed herein. The method overcomes previous limitations by allowing for a modeling language that is syntactically simple, while conceptually unlimited, while offloading the burdens of minutia and control structure to the hyperpiler.

19 Claims, 5 Drawing Sheets

HYPERPILER

CROSS REFERENCES TO RELATED APPLICATIONS

The Present Application is a continuation application of U.S. patent application Ser. No. 16/782,378, filed on Feb. 5, 2020, which claims priority to U.S. Provisional Patent Application No. 62/870,031, filed on Jul. 2, 2019, and U.S. Provisional Patent Application No. 62/879,497, filed Jul. 28, 2019, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to the development and compiling of computer programs.

Description of the Related Art

Traditionally, a person developer will create a computer program by manually typing instructions encoded in a given programming language's syntax. Typically, the developer will use a general purpose language (GPL) in which the developer specifies a control structure describing a series of computations to be conditionally executed. Common control structure statements in many programming languages include: if, else, for, and while. These statements control how instructions are sequenced over time, thus make the programming language "controlled." A programming language must have some control structures in order to be "Turing complete" or "computationally universal."

Traditionally, once a developer has finalized his GPL program, he inputs it into a compiler which converts the human-readable code into computer-executable code. Alternatively, the developer may write code in a GPL scripting language which is compiled by a special-case compiler called an "interpreter" that compiles the program at the time of execution. Compilers typically perform adjustments to optimize the input code, but do not alter or add functionality to the output code. Compilers typically perform a one-to-one functional translation of controlled input code to controlled output code.

Traditionally, a developer will use a modeling language to describe conceptual entities in a given conceptual framework. For example, a developer will use Hypertext Markup Language (HTML) to describe the layout of elements on a webpage. Here we can consider markup languages as special-case modeling languages. Modeling languages are intrinsically not suited for general programming purposes. Modeling languages typically lack control structures and are Turing incomplete, thus they are "uncontrolled." Because of this, modeling languages are typically not compiled to GPLs.

The downside of modeling languages is that they are less capable than general purpose languages, but their upside is that their simple syntax makes them much easier for humans to learn and write.

Developers have long sought a method for developing GPL computer programs via graphical user interface (GUI) or simplified syntax, but previous attempts have proven impractical. The impracticality has arisen from the trade-off between capability of the code and the simplicity of development. Previous methods would be highly capable, but so difficult to develop that manual coding proved more practical. Or, previous methods would be simple to develop, but so limited in their capabilities that they were relegated to niche tasks.

Ouali, U.S. patent Ser. No. 10/324,690, for an Automated Enterprise Software Development, discloses a graphical design tool that automatically generates a deployable application.

Darnell et al., U.S. patent Ser. No. 10/318,251 for a Code Generation And Simulation For Graphical Programming discloses a graphical block diagram for code generation.

Narayanan et al., U.S. patent Ser. No. 10/078,501, for a Domain Specific Language Modeling Framework In A Development Environment, discloses a method for generating a customized version of a computing system based on a modified DSL model.

Krishnan et al., U.S. patent Ser. No. 10/048,946 for Converting Visual Diagrams Into Code, discloses a tool for development of a computer program from a diagram.

Kaufman et al., U.S. patent Ser. No. 10/025,801 for Systems And Methods For Automatically Generating User Interface Elements For Complex Databases discloses generating a fully functional user interface based on an underlying schema within a RDBMS.

Koh et al, U.S. Pat. No. 9,880,922 for a System And Method For Automatically Generating Graphical Model From A Text-Based Program discloses generating a graphical model from an object-oriented, textual program.

Linebarger et al., U.S. Pat. No. 8,756,046 for Generation Of Code From A Graphical Model discloses a method for generating code from a graphical model.

BRIEF SUMMARY OF THE INVENTION

The present invention solves a computer-programming-centric problem by allowing a developer to use uncontrolled entities (typically encoded in a modeling language, database, program variables, or similar data framework) to describe the desired functionality of a computer program that is then generated in a general purpose computing language. Developing entities in a modeling language is much simpler, faster, and less error prone than developing in a general purpose language. Thus, the hyperpiler increases efficiency for current developers and expands the pool of possible new developers by reducing the complexity barrier. The present invention overcomes previous limitations by allowing for initial entities that are syntactically simple, while conceptually unlimited, while offloading the burdens of minutia and control structure to the hyperpiler.

One aspect of the present invention is a computer-implemented method for creating a computer program within a specific domain. The method comprises accessing a plurality of initial entities, each entity having one or more attribute-value pairs describing concepts to be expressed in the formed computer program. The method also includes accessing a domain ruleset for the targeted domain, the domain ruleset comprising rules for processing the initial entities into a computer program for the targeted domain. The method also includes accessing a set of code templates, at least some of which contain statements in one or more computer programming languages. The method also includes generating a plurality of generated entities by applying the domain ruleset to the initial entities. The method also includes forming a plurality of entity-template pairs by pairing each generated entity with its corresponding code template. The method also includes forming a plurality of code snippets by replacing designated variables in the code template with corresponding values from the generated entity in each entity-template pair. The method also includes forming a computer program by arranging the plurality of code snippets.

Another aspect of the present invention is a computer-implemented method for creating a controlled computer program from an arranged plurality of code templates. The method comprises accessing an uncontrolled plurality of entities, each entity having one or more attribute-values describing concepts to be expressed in the formed computer program, at least some of which have a designated template attribute, at least some of which have a designated identification attribute, at least some of which have a designated order attribute, and at least some of which have a designated parent attribute. The method also includes accessing a set of code templates, each code template having a designated name, at least some of which contain one or more statements in one or more computer programming languages, and at least some of which contain control statements. The method also includes forming a plurality of entity-template pairs by matching each entity with the code template whose name corresponds to the entity's designated template attribute value. The method also includes forming code snippets by replacing designated variables in the code template with corresponding attribute values from the entity in each entity-template pair. The method also includes nesting each child code snippet within the designated child point of its parent's code snippet by matching the child code snippet's entity's designated parent attribute value with the corresponding parent code snippet's entity's designated identification attribute value. The method also includes ordering sibling code snippets according to their entity's designated order attribute value. The method also includes forming a controlled computer program from the arranged code snippets.

Another aspect of the present invention is a non-transitory computer-readable medium that stores instructions causing a processor to perform functions to form a computer program within a specific domain. The processor executes the step of accessing a plurality of initial entities, each entity having one or more attribute-value pairs describing concepts to be expressed in the formed computer program. The processor executes the step of accessing a domain ruleset for the targeted domain, the domain ruleset comprising rules for processing the initial entities into a computer program for the targeted domain. The processor executes the step of accessing a set of code templates, at least some of which contain statements in one or more computer programming languages. The processor executes the step of generating a plurality of generated entities by applying the domain ruleset to the initial entities. The processor executes the step of forming a plurality of entity-template pairs by pairing each generated entity with its corresponding code template. The processor executes the step of forming a plurality of code snippets by replacing designated variables in the code template with corresponding values from the generated entity in each entity-template pair. The processor executes the step of forming a computer program by arranging the plurality of code snippets.

Another aspect of the present invention is a non-transitory computer-readable medium that stores instructions causing a processor to perform functions to form a controlled computer program. The processor executes the step of accessing an uncontrolled plurality of entities, each entity having one or more attribute-values describing concepts to be expressed in the formed computer program, at least some of which have a designated template attribute, at least some of which have a designated identification attribute, at least some of which have a designated order attribute, and at least some of which have a designated parent attribute. The processor executes the step of accessing a set of code templates, each code template having a designated name, at least some of which contain one or more statements in one or more computer programming languages, and at least some of which contain control statements. The processor executes the step of forming a plurality of entity-template pairs by matching each entity with the code template whose name corresponds to the entity's designated template attribute value. The processor executes the step of forming code snippets by replacing designated variables in the code template with corresponding attribute values from the entity in each entity-template pair. The processor executes the step of nesting each child code snippet within the designated child point of its parent's code snippet by matching the child code snippet's entity's designated parent attribute value with the corresponding parent code snippet's entity's designated identification attribute value. The processor executes the step of ordering sibling code snippets according to their entity's designated order attribute value. The processor executes the step of forming a controlled computer program from the arranged code snippets.

Other aspects include components, devices, systems, improvements, methods, processes, applications, computer-readable mediums, and other technologies related to any of the above, including the steps taken alone or in combinations.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
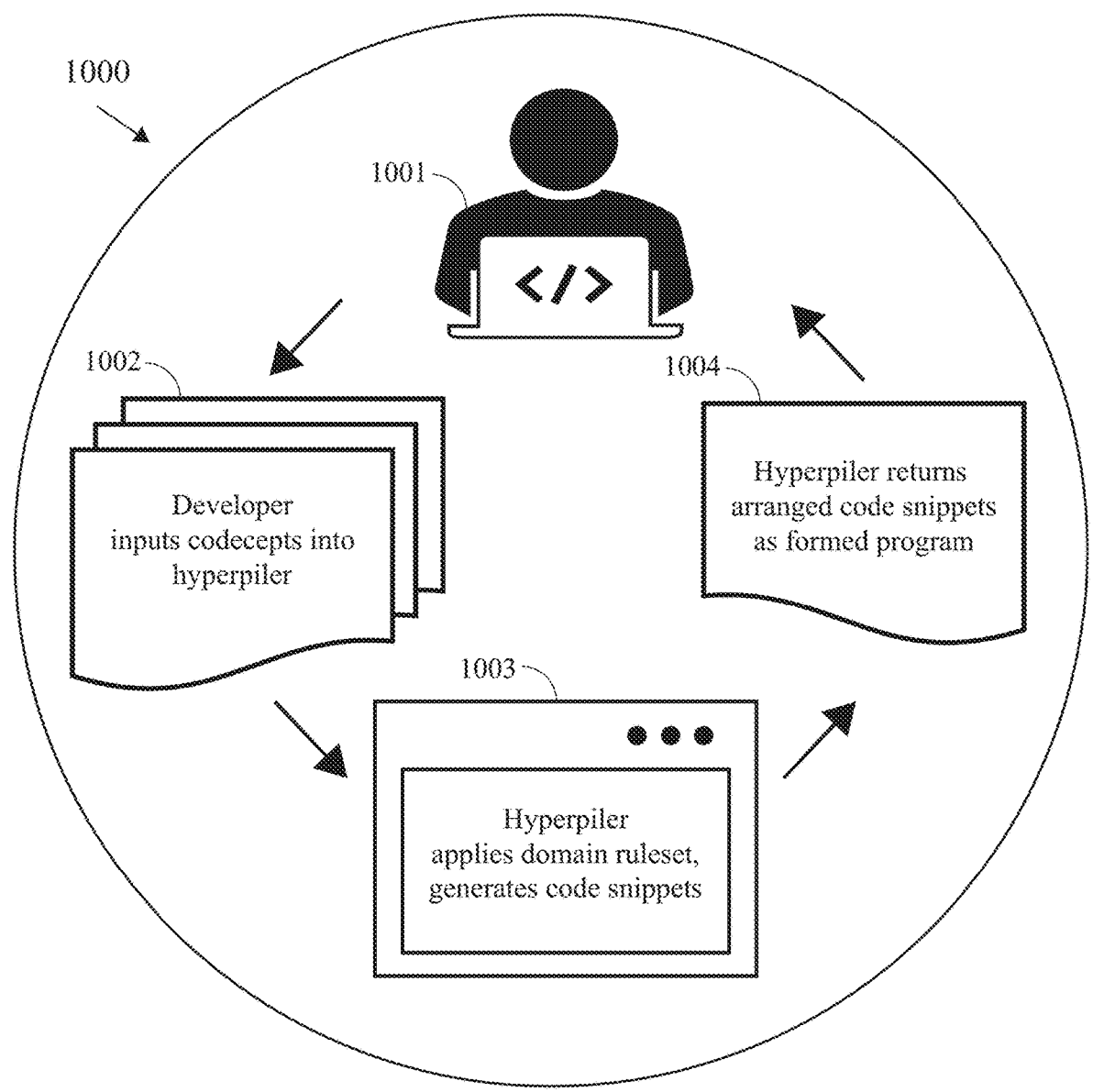
FIG. 1 illustrates a development cycle for a hyperpiler.

FIG. 1 illustrates a development cycle 1000 for a hyperpiler. In this embodiment, the input and formed programs are exchanged with a person developer 1001. At block 1002, the developer inputs codecepts into a hyperpiler. At block 1003, the hyperpiler applies domain ruleset to the codecepts to generate a computer program. At block 1004, the hyperpiler outputs the formed program to the developer.

Figure 2:
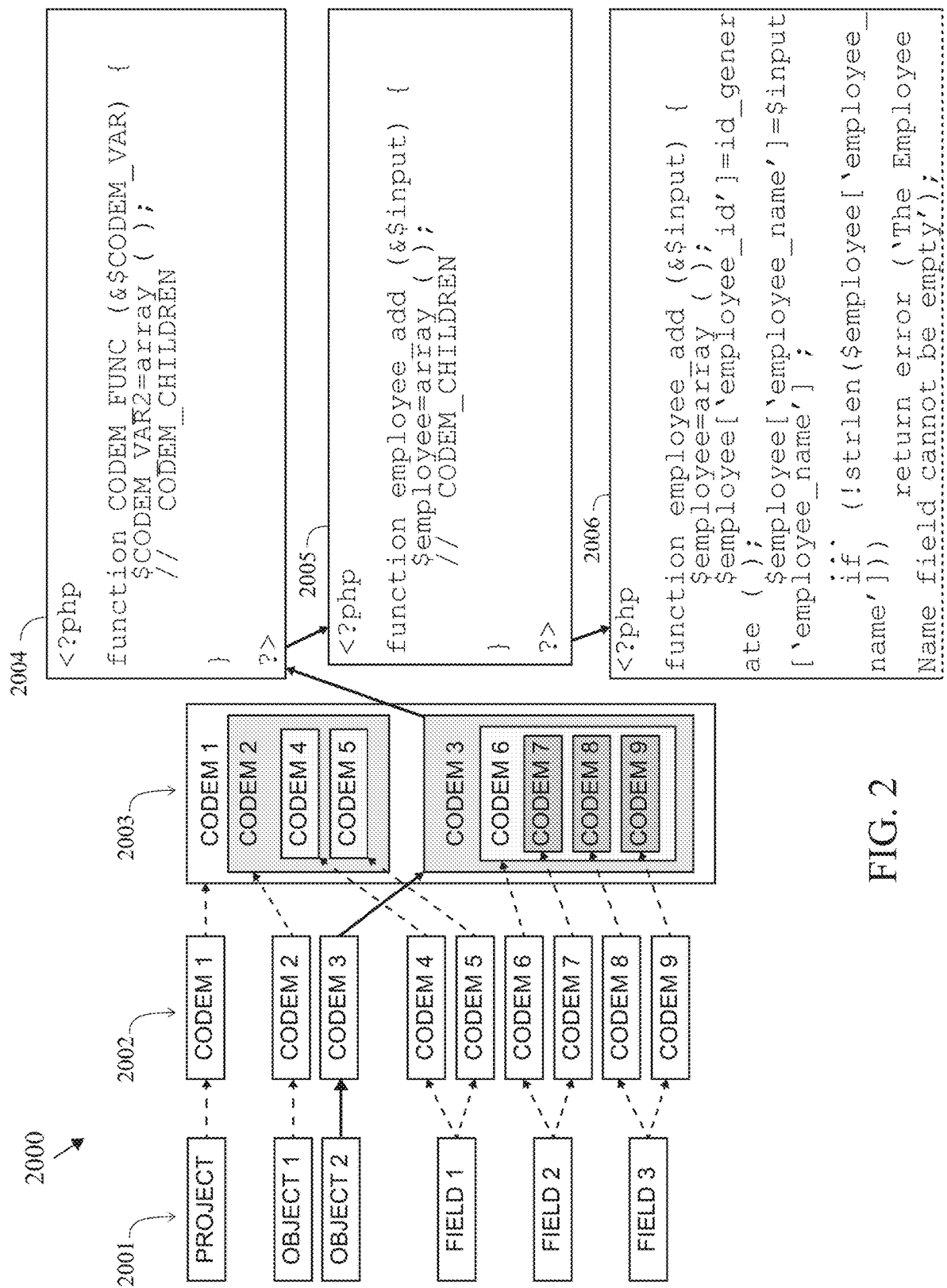
FIG. 2 illustrates a codecept-codem-codelet process the hyperpiler performs in conjunction with a domain ruleset.

FIG. 2 illustrates a codecept-codem-codelet process of the hyperpiler 2000. A first column 2001 represents codecepts. A second column 2002 represents codems generated form the codecepts. A third column 2003 represents codems that are arranged by nesting and ordering. At block 2004, a codem is paired with a codelet (PHP code). At block 2005, codelet variablets are replaced with codem attribute values. At block 2006, each codelet's child point is filled with its child codem-codelets.

Figure 3:
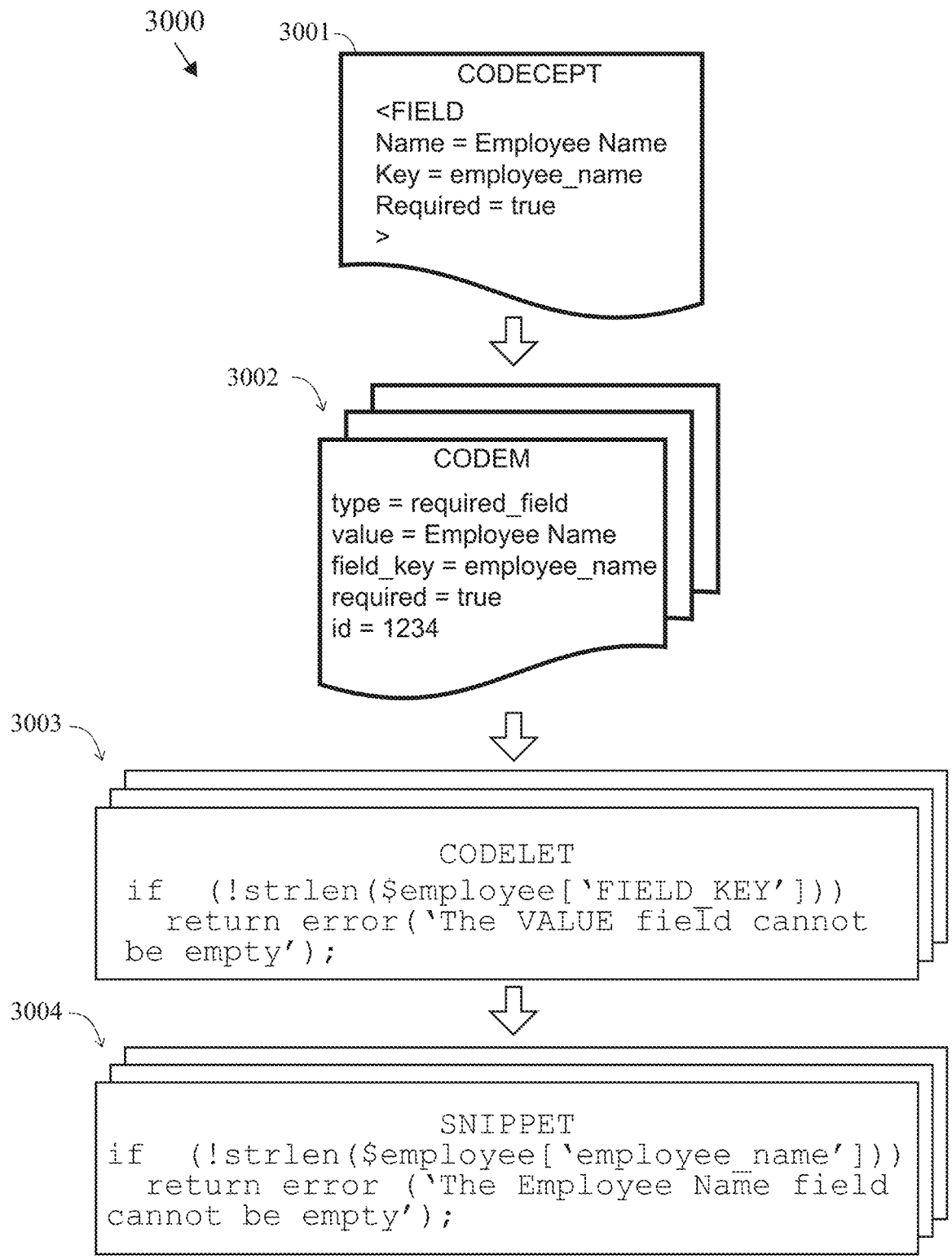
FIG. 3 illustrates a block diagram of how attribute values are passed from codecept to codem to codelet to code snippet.

FIG. 3 illustrates a block diagram 3000 of how attribute values are passed from codecept to codem to codelet to code snippet. At block 3001, a field codecept is inputted into the hyperpiler engine. At block 3002, the attribute values from the codecept are transposed into codem attribute values. At block 3003, the hyperpiler engine selects the corresponding codelet. At block 3004, the hyperpiler transposes attribute values from the codem into the codelet to form a code snippet to be included in the formed program.

Figure 4:
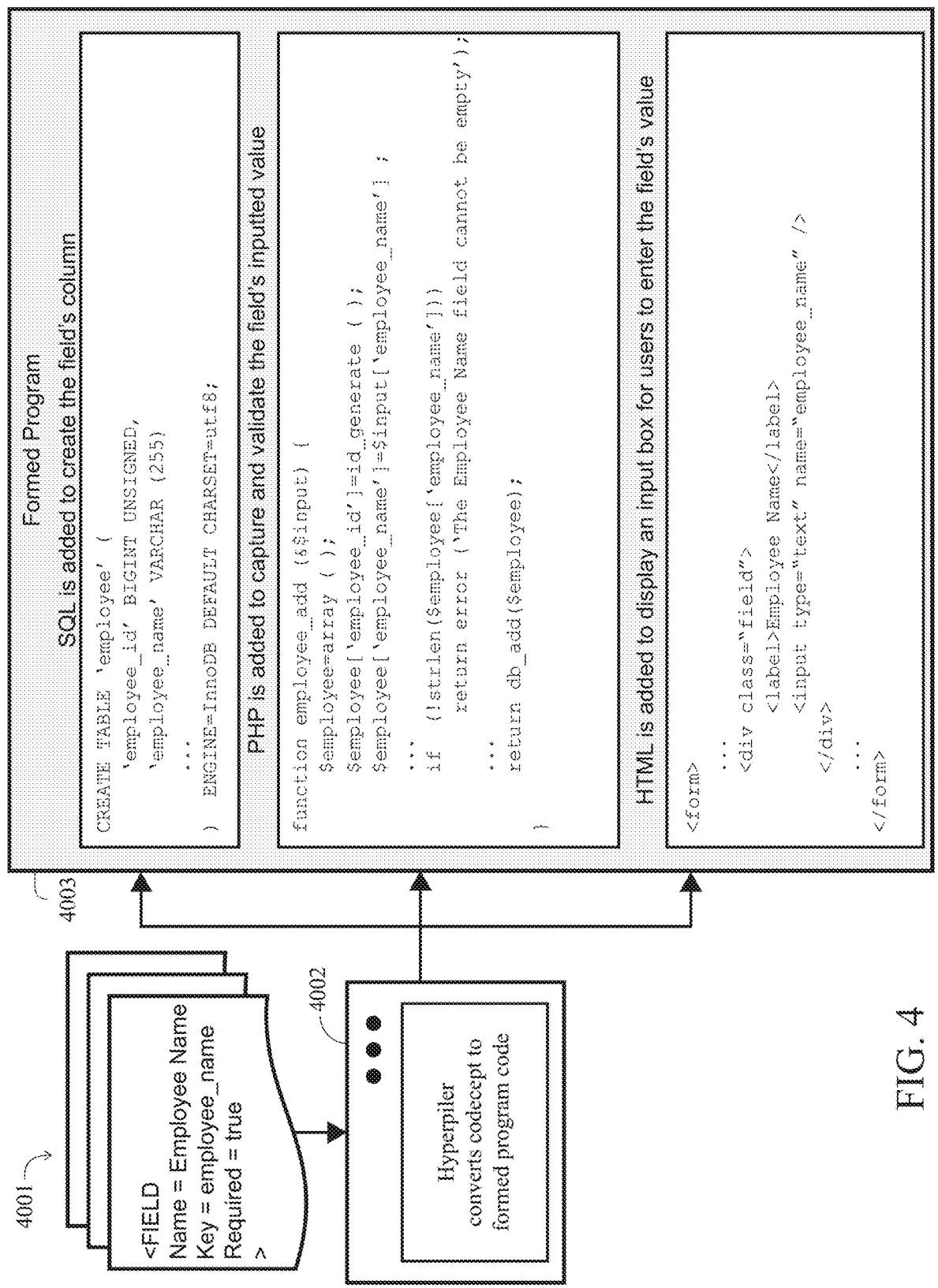
FIG. 4 illustrates the conversion of a single codecept to multiple code snippets in a formed program.

FIG. 4 illustrates how a single codecept is converted to multiple code snippets in a formed program. Only relevant portions of the formed program are shown in this example. At block 4001, the field codecept includes a name attribute, a key attribute, and a required attribute. At block 4002, the field codecept is inputted into the hyperpiler which converts the codecept to multiple code snippets. At block 4003, the formed program receives a code snippet of SQL to create database column that corresponds to the field codecept. The formed program receives a code snippet of PHP to capture and validate user input that corresponds to the field codecept. The formed program receives a code snippet of HTML to display an input box corresponding to the field codecept.

Figure 5:
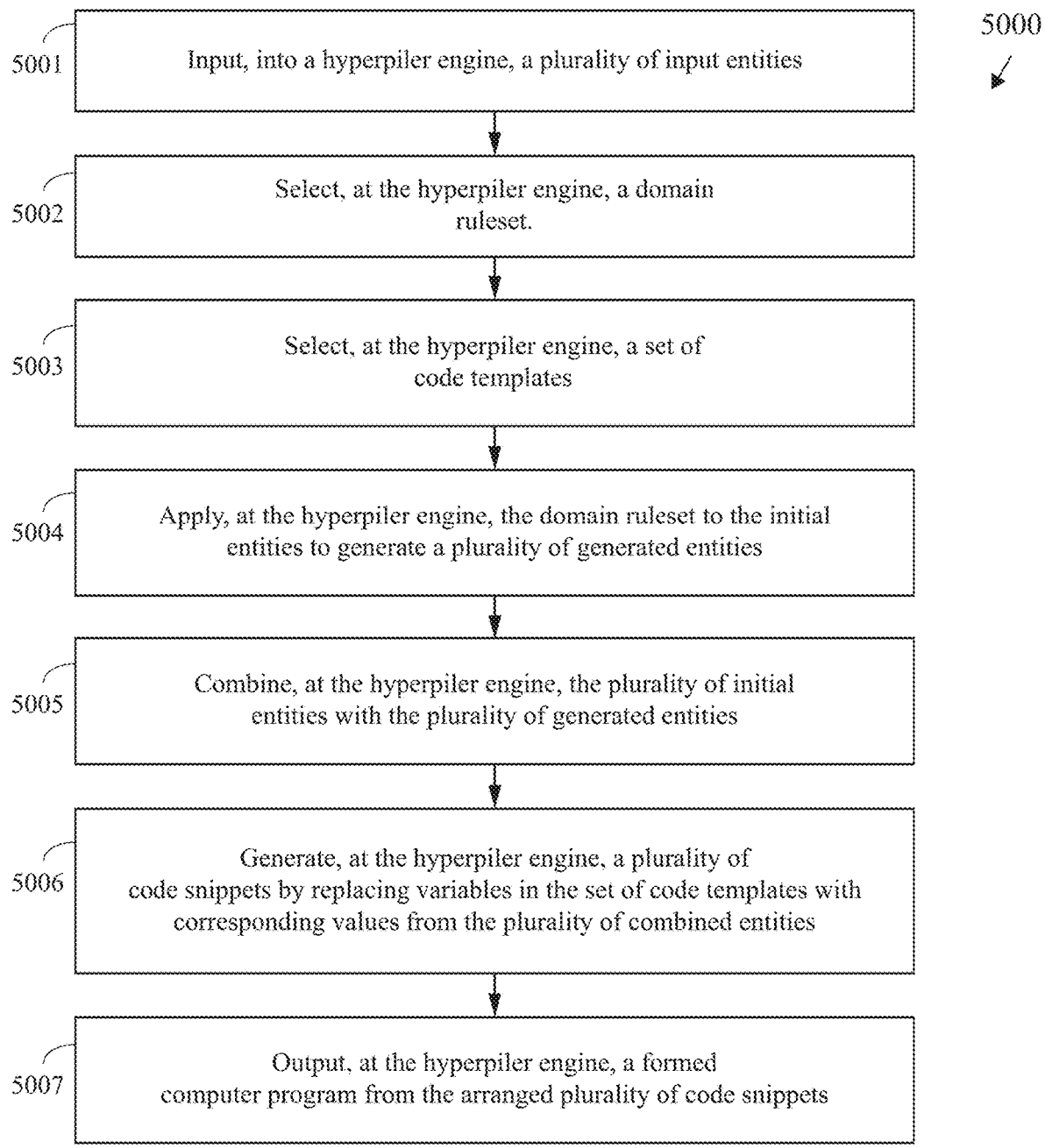
FIG. 5 is a flow chart for a computer-implemented method for generating a computer program via a hyperpiler engine.

FIG. 5 shows a flow chart 5000 for a computer-implemented method for generating a computer program. At block 5001, a plurality of initial entities are inputted into a hyperpiler. At block 5002, a domain ruleset is selected. At block 5003, a set of code templates is selected. At block 5004, the domain ruleset is applied to the initial entities to generate a plurality of generated entities. At block 5005, the plurality of initial entities is combined with the plurality of generated entities. At block 5006, a plurality of code snippets are generated by replacing variables in the set of code templates with corresponding values from the plurality of combined entities. At block 5007, a formed computer program from the arranged plurality of code snippets is outputted.

General Definitions

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Attribute provides additional information about an entity. Each attribute is a key and corresponds to a value, both of which are typically strings.

Cascading Style Sheets (CSS) is a W3C standard for defining the presentation of Web documents.

Code snippet is a string of text containing a plurality of commands written in a given computer programming language.

Compiler is a computer program that translates a series of instructions written in one computer language into a different computer language. An interpreter is a special case compiler that compiles code upon execution or "on the fly." A transpiler is a special case compiler that typically converts code designed for one computing system to code designed for a different computing system.

A controlled computer program is one that contains sequential or conditional statements, directing how the computing device will execute the program. In principal, the sequence of execution of a controlled program is unknowable without knowing the relevant inputs. Common control statements include: if, else, for, and while.

Developer is a person who creates a computer program, traditionally by writing computer code.

Entity is a conceptual object expressed as a discrete data object in a computer program.

Field is a single variable, typically a string, used in the input or output of a computer program. One cell of one row in a database constitutes a field. A plurality of fields are typically used for the input of an API program.

HyperText Markup Language (HTML) is a method of mixing text and other content with layout and appearance commands in a text file, so that a browser can generate a displayed image from the file.

Hypertext Transfer Protocol (HTTP) is a set of conventions for controlling the transfer of information via the Internet from a Web server computer to a client computer, and also from a client computer to a Web server.

Internet is the worldwide, decentralized totality of server computers and data-transmission paths which can supply information to a connected and browser-equipped client computer, and can receive and forward information entered from the client computer.

JavaScript is an object-based programming language. JavaScript is an interpreted language, not a compiled language. JavaScript is generally designed for writing software routines that operate within a client computer on the Internet. Generally, the software routines are downloaded to the client computer at the beginning of the interactive session, if they are not already cached on the client computer. JavaScript is discussed in greater detail below.

Modeling Language is an artificial language that can be used to express information or knowledge or systems in a structure that is defined by a consistent set of rules. The rules are used for interpretation of the meaning of components in the structure. Modeling languages are typically uncontrolled.

Formed computer program of the hyperpiler is controlled computer code in a given programming language that can be executed, compiled, interpreted, or similarly run by a computer. The formed computer program may contain multiple files and multiple sub programs to be executed at once or separately. The formed computer program contains a control structure and is a controlled program.

PHP is a scripting language that allows developers create dynamically generated Web pages, and is used for server-side programming.

Platform is the combination of a computer's architecture, operating system, programming language, runtime libraries and GUIs.

SQL (Structured Query Language) is a computer language designed for data retrieval and data management in a database.

An uncontrolled computer program is one that lacks sequential or conditional control. The simplest form of an uncontrolled program is a list of entities.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, APPLE SAFARI, MOZILLA FIREFOX, and CHROME.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access. Servers usually contain one or more processors (CPUs), memories, storage devices and network interface cards. Servers typically store the HTML documents and/or execute code that generates Web-pages that are sent to clients upon request. An interactive-form information-collection process generally is controlled from a server computer, to which the sponsor of the process has access.

Hyperpiler

The hyperpiler converts uncontrolled initial entities into a controlled computer program. The hyperpiler differs from a traditional compiler in a number of ways.

A traditional compiler faithfully converts a set of computing tasks from one programming language to another, performing as close to a one-to-one functionality conversion a possible. Accordingly, a traditional complier does not add functionality to the formed program. Nor does a traditional compiler inject control structures in the output program that did not exist in the input program.

Conversely, the hyperpiler performs a one-to-many conversion, converting one codecept into multiple distinct computing task code snippets in the formed program. This distinction allows the hyperpiler to add functionality and control structures to the formed program that were not explicitly described by the initial entities. The formed program code does not need to linearly correspond to the initial entities. Two independent codecepts in the initial entities may mutually modify each other's code snippets in the formed program, or they may generate a plurality of code snippets in the formed program.

The extra abilities of the hyperpiler come at the cost of flexibility. Because functionality and control is not explicit in the initial entities, the hyperpiler must derive these from one of a limited number of domain rulesets, each containing a limited number of rules. The limited domain rulesets and rules within each mean the hyperpiler typically cannot serve as a general purpose compiler.

Codecepts

The present invention preferably starts with a list of initial entities. These initial entities are termed, "codecepts," a portmanteau of "code" and "concept." Each codecept represents an idea the developer wishes to express in the formed program. Each codecept is preferably an independent data object, containing a list of attribute-value pairs, describing details of how that codecept is to be expressed. This codecept syntax is intended to allow the developer to express his ideas in the simplest form possible.

The types of codecepts and the types of attributes are "domain-specific" as they will reflect the type of formed program for which they are intended.

The codecepts are "uncontrolled" as they do not require conditional or sequential commands such as if, else, for, and while. Preferably, the codecepts are treated as an enumerated array of associative arrays. All logic and control governing the codecepts is preferably stored in the domain ruleset, and each rule is applied to each codecept. Codecepts trigger or untrigger rules in the domain ruleset, but preferably do not alter those rules.

The codecepts can be embodied in a number of different syntaxes, including:

(a) a Linear XML-Like Syntax:

```
<codeceptType1 attr1="value1" attr2="value2">
<codeceptType2 attr1="value1" attr2="value2" attr3="value3">
```

(b) a Nested XML-Like Syntax:

```
<codeceptType1>
    <attr1>value1</attr1>
    <attr2>value2</attr2>
</codeceptType1>
<codeceptType2>
    <attr1>value1</attr1>
    <attr2>value2</attr2>
    <attr3>value3</attr3>
</codeceptType1>
```

(c) a JSON-Like Syntax:

```
[
    {codecept="codeceptType1", attr1="value1", attr2="value2"},
    {codecept="codeceptType2", attr1="value1", attr2="value2",
    attr3="value3"}
]
```

(d) a Program Variable Syntax (for Example, PHP):

```
$entities=array(
    array(
        'codecept'=>"codeceptType1",
        'attr1'=>"value1",
        'attr2'=>"value2"
    ),
    array(
        'codecept'=>"codeceptType2",
        'attr1'=>"value1",
        'attr2'=>"value2",
        'attr3'=>"value3"
    )
);
```

(e) a List of Variables Syntax:

```
$codecept1='codeceptType1';
$codecept1attr1='value1';
$codecept1attr2='value2';
$codecept2='codeceptType2';
$codecept2attr1='value1';
$codecept2attr2='value2';
$codecept2attr3='value3';
```

(f) a Natural Language-Like Syntax:
codecept1 is a codeceptType1.
The attr1 of codecept1 is value1.
The attr2 of codecept1 is value2.
codecept2 is a codeceptType2.
The attr1 of codecept2 is value1.
The attr2 of codecept2 is value2.
The attr3 of codecept2 is value3.

(g) a CSV-Like Syntax (with a Specified Order for Attributes):
codeceptType1,value1,value2
codeceptType2,value1,value2,value3

In XML-like syntax's the "tag" can be considered a presumed codecept or type attribute.

The simplicity of the codecepts allows them to be easily stored in a database. Preferably, codecepts are stored in a relational database wherein each codecept is a database row, each type of codecept is a database table, each allowable attribute is a database column, and each attribute value is a cell. In practice, a database storing multiple programs will have additional columns identifying to which program each codecept belongs. An example in SQL is:

```
INSERT INTO 'codeceptType1' SET 'id'=1, 'attr1'="value1",
'attr2'="value2";
INSERT INTO 'codeceptType2' SET 'id'=2, 'attr1'="value1",
'attr2'="value2", 'attr3'="value3";
```

Alternatively, the codecepts are stored in a key-value database, entity-attribute-value database, document database, no-SQL database, or other suitable database system.

By storing codecepts in a database, the developer can utilize a number of tools to manipulate the codecepts, including graphical user interfaces and websites connected to the database. The data objects retrieved from the database can be inputted directly into a hyperpiler, or the data objects can be converted to a textual representation prior to input.

In one embodiment, codecepts themselves may contain information relating to desired control structures in the formed program. This should not be confused with the codecept itself, which is uncontrolled in the hyperpiler, with the corresponding controlling statements the codecept will express in the formed program. For example, a codecept may represent an if concept that will be hyperpiled into an if code statement in the formed program. The computing device executing the formed program will evaluate one or more variables (whose values are typically unknown prior to execution) in the clause of the if statement and conditionally execute the code within the corresponding subroutine, making the formed program controlled. Conversely, the hyperpiler preferably applies all of the relevant domain ruleset rules to all of the relevant codecepts, regardless of the existence of the if codecept, making the codecepts uncontrolled.

In one embodiment, the domain ruleset may contain rules that allow one codecept to entirely negate another codecept. For example, one codecept may state X is true, while another codecept may state X is false. The domain ruleset may contain a rule that if X is both true and false, it should effectively ignore X. This embodiment is not preferred as it is typically more efficient to simply remove both codecepts before hyperpiling.

Optionally, codecepts may contain attribute values that are code snippets to be included the formed program generated by the hyperpiler. This allows experienced developers to have precise control over the formed program with custom manual code snippets, while still allowing simple development with the hyperpiler.

Optionally, the codecepts may be encoded as variables, objects, or similar entities within a general purpose programming language. The codecepts may be embodied next to general purpose code that will be combined with the formed program generated by the hyperpiler. The encoding of the codecepts in a general purpose programming language and/or the addition of general purpose code should not be construed as negating the uncontrolled nature of the codecepts.

Typically, attribute values are strings, integers, or decimal numbers.

In some embodiments, an attribute value may be an array.

In some embodiments, an attribute value may be a string representing a list of values, each value separated by a given dividing string.

In some embodiments, an entity's attributes and values may not be syntactically contained within the entity. Attributes and values may be linked through identifiers.

Domain Ruleset

The domain ruleset contains a series of rules governing how the hyperpiler converts the codecepts into a formed program of a specified domain.

The domain ruleset is "domain-specific" as it can only construct a program that functions in a certain predetermined way. Typically, programs in a domain will be designed to run on the same type of computing device, take input in the same format, and push output in the same format. A domain might be a platformer game, a read-eval-loop (REPL) command line interface (CLI) script, or a web service application programming interface (API).

In some cases, a domain may include multiple programs, each designed to run on different devices. For client-server domains, the domain ruleset may construct a program to run on a web server, HTML files, a program to run on iOS devices, and a program to run on Android devices. In this case, the HTML, iOS, and Android programs share similar features that mirror the functions of the server program, thus grouping all of these programs under one domain is logical and practical.

A hyperpiler may contain one or more domain rulesets. For a hyperpiler containing only one domain ruleset, the selection of which domain ruleset to be used is intrinsic in the selection of that hyperpiler. For hyperpilers with multiple domain rulesets, the desired domain ruleset must be selected in some manner. This is preferably selected through explicit initial entities. Alternatively, the hyperpiler may automatically determine the desired domain ruleset by analyzing the initial entities and attributes for specific characteristics. Alternatively, the desired domain ruleset may be separately inputted into the hyperpiler.

Rules and logic that are programmed into the hyperpiler engine itself should also be considered to be rules of the selected domain ruleset.

Codems

The domain ruleset is applied to the codecepts to generate generated entities. These generated entities are termed "codems," a portmanteau of "code" and "element." Each codem represents a code task (or string) the domain ruleset wishes to be expressed in the formed program. A codem is typically represented as an entity-attributes-values data object with standardized attribute names.

Codems are typically not explicitly defined in the codecepts. The domain ruleset uses preprogrammed logic and implicit cues from the codecepts to determine what codems to generate. Each codecept may generate zero, one, or many codems depending on the domain ruleset. Typically, each codecept will generate multiple codems.

Each codem preferably contains certain attributes: a type attribute, which is used to match the codem to the codelet; an id attribute, uniquely identifies the codem; and a parent attribute whose value is typically the id of another codem.

Each rule of the domain ruleset preferably contains: conditions identifying applicable codecepts; default attribute values for the new codem; and a process to transpose and modify certain codecept attribute values to the codem's attribute values.

An example rule in the domain ruleset might work as follows: (a) if the codecept's type attribute equals field and its required attribute equals true, then create a new codem; (b) set the codem's type attribute to equal required; (c) set the codem's field key attribute to equal the codecept's key attribute value; (d) set the codem's id attribute to equal the codecept's id attribute value, concatenated with the string req; (d) set the codem's parent attribute to equal the codecept's parent attribute value. This example demonstrates some of the different ways a rule may transpose attribute values from a codecept to a codem.

Preferably codecepts and codems share a similar data structure, making conversion simple.

The domain ruleset may additionally generate codems that are similar or identical to codecepts.

In one embodiment, the domain ruleset is applied during the creation of codecepts, generating one or more codems upon creation of a codecept.

Codelets

The hyperpiler loads a set of code templates. A code template is termed a "codelet." Each codelet typically contains one or more statements in one or more programming languages. The codelets in a given set are typically designed to mutually interoperate in the formed program.

Typically, a set of code templates will contain a primary programming language such as PHP, JavaScript, C, Go, Perl, Python, or similar.

The set of code templates may also contain secondary programming languages where needed. For example, a set of code templates designed to output a website application might contain PHP, HTML, CSS, JavaScript, and SQL.

A hyperpiler may store multiple sets of code templates and allow the developer to select his preferred formed programming language and architecture. One domain ruleset may be compatible with multiple sets of code templates.

Optionally, codelets may be blank.

Optionally, codelets may contain simple strings of words, numbers, letters, binary, or text.

Typical codelets contain special variables, termed "variablets." The hyperpiler, according to the domain ruleset, replaces the variablets with corresponding values from the codems.

Variablets are preferably differentiated from the typical underlying programming languages variables in such a way that a codelet containing variablets is still considered valid code of the underlying programming language. This allows codelet developers (who develop the hyperpiler, not to be confused with developers using the hyperpiler) to use all available programming language syntax parsing tools while developing codelets.

In one embodiment, the underlying programming language of a codelet uses lowercase names for statements and variables, while variablets are distinguished by all uppercase names. For example, a codelet might contain the PHP statement function create_OBJNAME ( ) { }, in which case the hyperpiler could easily replace OBJNAME with the appropriate value.

Alternatively, variablets may be implemented as variables in the underlying programming language.

Alternatively, variablets may be designated with special characters.

Preferably, one variablet marks the child point.

In the preferred embodiment, the hyperpiler pairs each codem with a copy of a codelet, based on the codem's type value. This forms a plurality of codem-codelet pairs.

Multiple copies of one codelet may be paired with many codems. It should not be assumed that each codelet is limited to one pairing or one use in the formed program.

Some codelets from the set may not be used at all.

In the preferred embodiment, the hyperpiler arranges the codem-codelet pairs by recursively nesting them and then ordering them.

In the preferred embodiment, the hyperpiler replaces the variablets in each codelet with the corresponding values from the codem in each codem-codelet pair. The result is a plurality of code snippets, encoded in the desired formed program programming languages, customized according to the codecepts entered by the developer.

In the preferred embodiment, the hyperpiler recursively replaces each codem-codelet's child point variablet with the concatenated code snippets generated by its nested children codem-codelets. The codem in codem-codelet pair contains an id attribute and a parent tribute. The "child" of a "parent" is identified by matching the child's parent attribute to the parent's id attribute. This process starts by generating code snippets for the lowest children codem-codelets, nesting them within their parents' code, nesting them within their parents' code, and so forth. This preferably ends with all relevant code snippets ordered and arranged into a continuous data object, string, or similar.

In the preferred embodiment, the hyperpiler orders sibling codem-codelet pairs based on the codem's order value.

Codelets may contain control structures for the formed program, including statements such as if, else, for, while, and similar. Such codelets preferably have their child point placed within the conditionally-executed subroutine (or similar) so that child code snippets can be so conditionally executed. The nesting of such codelets is what allows the domain ruleset to impose a control structure that is not explicit in the codecepts.

Optionally, the entity-template pairs each comprise a plurality of generated entities, a set of code templates, or pluralities of both.

Formed Program

The arranged code snippets form the code of the formed program.

The formed program may be segmented into files (or similar) according to the domain ruleset and relevant codecepts.

The formed program may comprise multiple programs, formed together or separately.

The hyperpiler typically outputs the formed program to the developer through a human interface.

Alternatively, the hyperpiler may output the formed program to a different computing device for execution, at present or in the future.

Alternatively, the hyperpiler may cause the formed program to be executed, at present or in the future, on the same computing device executing the hyperpiler.

The hyperpiler may additionally compile the formed program into another programming language, assembly language, object code, machine code, or other computer-executable code.

Implementation as a Framework

The hyperpiler can alternatively be implemented as a framework program.

Here a "framework program" describes a program containing a prewritten body of code combined with variable settings to alter the conditional execution of that code. In this implementation, the codecepts, the domain ruleset, and the codelets are all contained within the code of the framework program, encoded in the framework program's given programming language.

The codecepts are encoded as variables within the framework program.

The domain ruleset is encoded into the control structure of the framework program.

The codelets are encoded as subroutines and/or commands contained within conditional expressions of the framework program.

The hyperpiling occurs upon traditional compiling (or interpreting) of the framework program.

In this embodiment, the traditional compiler converts the framework program using the codecept variables to selectively arrange and execute the code of the desired codelet subroutines, while selectively ignoring the undesired codelet subroutines. Whereas the preferred hyperpiler takes limited initial entities and adds functionality, the framework program has unlimited possible combinations of functionality and selectively limits the final functionality according to the initial entities upon compiling. The code framework implementation is currently less preferred as computer execution of the resulting code is typically slower than that of the preferred method, however this may change with advances in the pertinent arts.

Example

The following example illustrates one embodiment of the hyperpiler.

Two codecepts, embodied in an HTML-like syntax, are loaded into a hyperpiler engine:

<object name="employee" title="Employee" id="1">
<field name="firstname" title="First Name" id="2" parent="1" type="text">

The hyperpiler engine loads a domain ruleset designed to output a database-driven website.

The hyperpiler engine loads a set of codelets containing PHP, HTML, and SQL code.

The domain ruleset is applied to the two codecepts to generate several codems. Certain codems are generated by default by the ruleset. For illustration, the codems herein are expressed in an HTML-like syntax. For illustration, attribute values carried over from the codecepts are bolded.

By default, the domain ruleset generates a codem to create a file to hold SQL commands to form the relevant databases:

<codem type="file_sql" filename="create.sql" id="100">

From the <object> codecept, the domain ruleset generates a codem to create a database table. Note the "name" attribute is transposed from the codecept to the codem.

<codem type="sql_table_add" name="employee" id="101" parent="100">

From the <field> codecept, the domain ruleset generates a codem to add a column within that database table. Note the parent value of the codem equals the id value of the previous codem to signify to which table this column belongs. Here the type value from the codecept is translated into the appropriate corresponding SQL type.

<codem type="sql_row_add" name="firstname" type="varchar(255)" id="102" parent="101">

From the <object> codecept, the domain ruleset generates a codem to create PHP file for adding a new row to that table. That file contains two sections, one section for executable PHP and one to display HTML code. Note the domain ruleset automatically gives the executable section an order of 1 and the display section an order of 2. Note the domain ruleset chose the filename attribute by using the <object>'s name and then appending _add.php.

<codem type="file_php" filename="employee_add.php" id="200">
<codem type="php_exec" id="201" parent="200" order="1">
<codem type="html" id="202" parent="200" order="2">

From the <object> codecept, the domain ruleset generates a codem for saving the inputted value as a new row in the database. This codem's parent value is the PHP executable section of employee_add.php where it will be located.

<codem type="php_row_add" table="employee" id="300" parent="201">

From the <field> codecept, the domain ruleset generates a codem to accept the firstname field as column in the new database row:

<codem type="php_col_input" table="employee" column="firstname" id="400" parent="300">

From the <object> codecept, the domain ruleset generates a codem for the HTML form that will be submitted:

<codem type="html form" title="Add Employee" action="employee_add.php" parent="202" id="500">

Since the <field> object is loaded in an HTML-like format with HTML-like attributes for an HTML initial entity, it can be converted into a similar codem:

<codem type="html input" type="text" name="firstname" id="600" parent="500">

The codecepts and codems combined into codems, now comprises:

<codem type="file_sql" filename="create.sql" id="100">
<codem type="sql_table_add" name="employee" id="101" parent="100">
<codem type="sql_row_add" name="firstname" type="varchar(255)" id="102" parent="101">
<codem type="file_php" filename="employee_add.php" id="200">
<codem type="php_exec" id="201" parent="200" order="1">
<codem type="html" id="202" parent="200" order="2">
<codem type="php_row_add" table="employee" id="300" parent="201">
<codem type="php_col_input" table="employee" column="firstname" id="400" parent="300">
<codem type="html form" title="Add Employee" action="employee_add.php" parent="202" id="500">
<codem type="html input" type="text" name="firstname" id="600" parent="500">

Each codem type now corresponds to a codelet. Each codem is paired with a copy of its corresponding codelet. The variablets in each codelet are replaced with the corresponding attribute values from its paired codem. The resulting code snippets are nested according to the codems parent value and then ordered according to their order value.

The following describes this process for the first three codems listed—codem100, codem101, and codem101— used for SQL database creation.

The codelet for codem100 is file_sql, this codelet simply contains a child point. The purpose of this codelet type is to signify that this codem should be outputted as its own file called create.sql in the formed program. The codelet contents initially reads:

Child

The codelet for codem101 is sql_table_add, which contains SQL code:

create table 'NAME' (CHILD) engine=innodb;

The codelet for codem102 is sql_row_add, which contains an SQL fragment:

'NAME' (TYPE),

When the variablets are replaced and the children snippets are nested, these three combined codems output a file containing the following. Note the trailing comma is removed from codem102 as the hyperpiler formatted the code, which is a typical step.

create table 'employee' ('firstname' varchar(255)) engine=innodb;

The hyperpiler then follows a similar process to fill the other files with relevant code. Upon completion, the hyperpiler outputs the files to the developer.

Additional Considerations

Those skilled in the pertinent art will recognize that the names of attributes described in the present invention are arbitrary.

The initial entities syntax preferably comprises a method for distinguishing each of the plurality of entities; a method for distinguishing each attribute; a method for assigning each attribute a key; a method for assigning each attribute a value; and a method for assigning each attribute to one or more of the plurality of entities.

The hyperpiler engine is alternatively comprised of multiple programs.

One or more of the components of the hyperpiler engine are alternatively implemented as a neural network.

This method is optionally applied to the development of a server program in a client-server network model, comprising a plurality of initial entities describing relational database tables, database columns, relationships between database columns, and permission rules for the database tables and a domain ruleset forming code that creates one or more non-database-native application programming interface (API) endpoints for each applicable database table to create, read, update, and delete (CRUD) a row in that table.

The relational database and its related terms are alternatively substituted for a non-relational database, graph database, document database, key-value store, entity-attribute-value store, time series database, CSV file, JSON file, or other structured non-transitory computer-readable data storage system and that system's corresponding terms.

The hyperpiler engine optionally generates human-readable documentation describing the formed program.

The hyperpiler engine optionally generates computer-readable documentation describing the formed program.

In a server-client program paradigm, the hyperpiler engine optionally constructs both the server program and the client program. In one embodiment, the client program is a mobile phone application, such as an Android, iOS, or similar application.

The domain ruleset is alternatively applied during development of the initial entities to generate generated entities automatically upon creation of an initial entity. This approach offers the same ease of development (the developer does not have to manually create the generated entities in either), while offering the developer the ability to modify the generated entities. For example, if a developer creates afield entity that has a true required attribute, then the domain ruleset may also generate an entity containing a text error message to display should an end user submit a request with that field blank to the formed program. By generating the generated entity immediately after the initial entity, and by storing the generated entity in the same form as the initial entity, the developer has the ability to edit the text of the error message using the same tools (GUI or otherwise) that he used to create the initial field initial entity.

The hyperpiler engine optionally validates the initial entities. Validation may be implemented to varying degrees. The hyperpiler engine necessarily validates the syntax of the initial entities according to the given syntax or modeling language. The hyperpiler engine preferably validates the syntax of the formed program according to its programming language. However, the hyperpiler engine may not necessarily validate that the initial entities will produce a useful or functional program. The hyperpiler may construct a syntactically correct, but useless formed program. In some cases, it may be impossible for the hyperpiler to validate the usefulness or functionality of the formed program.

For grammatical simplification, this specification treats the phrase "the plurality of Xs" as a plural noun, rather than a singular noun. As such, this specification uses the wording "the plurality of Xs are" rather than "the plurality of Xs is."

An operating system controls the execution of other computer programs, running of the PSO platform, and provides scheduling, input-output control, file and data management, memory management, and communication control and related services. The operating system may be, for example Windows (available from Microsoft, Corp. of Redmond, Wash.), LINUX or other UNIX variants (available from Red Hat of Raleigh, N.C. and various other vendors), Android and variants thereof (available from Google, Inc. of Mountain View, Calif.), Apple OS X, iOS and variants thereof (available from Apple, Inc. of Cupertino, Calif.), or the like.

The method described in connection with the embodiments disclosed herein is preferably embodied directly in hardware, in a software module executed by a processor, or in a combination of the two. A software module preferably resides in flash memory, ROM memory, EPROM memory, EEPROM memory, RAM memory, registers, a hard disk, a removable disk, a CD-ROM, or any other form of storage medium known in the art. An exemplary storage medium is preferably coupled to the processor, so that the processor reads information from, and writes information to, the storage medium. In the alternative, the storage medium is integral to the processor. In additional embodiments, the processor and the storage medium reside in an Application Specific Integrated Circuit (ASIC). In additional embodiments, the processor and the storage medium reside as discrete components in a computing device. In additional embodiments, the events and/or actions of a method reside as one or any combination or set of codes and/or instructions on a machine-readable medium and/or computer-readable medium, which are incorporated into a computer software program.

In additional embodiments, the functions described are implemented in hardware, software, firmware, or any combination thereof. If implemented in software, the functions are stored or transmitted as one or more instructions or code on a computer-readable medium. Computer-readable media includes both computer storage media and communication media including any medium that facilitates transfer of a computer program from one place to another. A storage medium is any available media that is accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection is termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and BLU-RAY disc where disks usually reproduce data magnetically, while discs usually reproduce data optically with lasers. Combinations of the above should also be included within the scope of computer-readable medium.

A computer program code for carrying out operations of the present invention is preferably written in a scripted or unscripted programming language such as C++, C#, SQL, Java, Python, Haskell, JavaScript, Typescript, PHP, Ruby, Go, or the like.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS"), or other similar protocols. The protocol at the server is preferably HTTPS.

Components of a server includes a CPU component, a graphics component, memory, non-removable storage, removable storage, Network Interface, including one or more connections to a fixed network, and SQL database(s). Included in the memory, is an operating system, a SQL server or other database engine, and computer programs/software.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. A computer-implemented method for forming a computer program within a specific domain, the method comprising:
    receiving a specification comprising a plurality of initial entities describing aspects of the computer program to be formed;
    generating a plurality of generated entities by applying a domain ruleset to the plurality of initial entities, the domain ruleset comprising rules for generating generated entities logically from values within the plurality of initial entities;
    forming a plurality of entity-template pairs by pairing each generated entity with a corresponding code template from a plurality of code templates;
    forming a plurality of code snippets by replacing designated variables in the code template with corresponding values from the generated entity in each entity-template pair; and
    forming a computer program by arranging the plurality of code snippets.

2. The method of claim 1, wherein a plurality of initial entities comprise values comprising code snippets to be included in the formed computer program.

3. The method of claim 1, wherein a plurality of initial entities are embodied as objects in a computer database.

4. The method of claim 1, wherein each of a plurality of initial entities is embodied as variables, objects, or similar data entities in a computer program.

5. The method of claim 1, wherein a human developer manipulates a plurality of initial entities via website, desktop computing application, mobile computing application, or other computer graphical user interface.

6. The method of claim 1, wherein the formed computer program comprises a plurality of programs, to be executed together or separately, on one or more computing devices.

7. The method of claim 1, additionally pairing initial entities with code templates to form entity-template pairs.

8. The method of claim 1, additionally compiling the formed computer program into assembly language, object code, machine code, or other computer code.

9. The method of claim 1, implemented as a framework program, comprising:
    the plurality of initial entities embodied as variables within the framework program;
    the domain ruleset embodied in the control structure of the framework program;
    the set of code templates embodied as subroutines in the framework program;
    the formed computer program formed by a compiler sequentially executing a subset of the code template subroutines according to the initial entities.

10. The method of claim 1, wherein one or more of the components of the domain ruleset are implemented as a neural network.

11. The method of claim 1, applied to the domain of a server program in a client-server network model, comprising:
    accessing a plurality of initial entities describing relational database tables, database columns, and relationships between database columns;
    forming a server program containing application programming interface (API) endpoints for each applicable database table to create, read, update, and delete (CRUD) a row in that table according to a coded permission scheme.

12. The method of claim 11, wherein the relational database and its related terms are substituted with those of a non-relational database, graph database, document database, key-value store, entity-attribute-value store, time series database, CSV file, JSON file, or other non-transitory computer-readable data storage system and that system's corresponding terms.

13. The method of claim 1, additionally generating human-readable documentation describing the formed computer program.

14. The method of claim 1, additionally generating computer-readable documentation describing the formed computer program.

15. The method of claim 1, wherein the domain ruleset is applied during development of the plurality of initial entities, generating one or more generated entities upon creation of an initial entity.

16. The method of claim 1, wherein the domain ruleset comprises multiple rulesets, algorithms, or programs to be applied at once or in stages.

17. The method of claim 1, wherein a plurality of entity-template pairs each comprise a plurality of entities, a plurality of code templates, or pluralities of both.

18. A computer-implemented method for forming a controlled computer program from an arranged plurality of code templates, the method comprising:
    accessing a plurality of code templates, each template comprising a code snippet to be included in the formed computer program;
    forming a plurality of entity-template pairs by matching each entity from a specification with a code template from a plurality of code templates identified by the entity's designated template attribute value;
    forming code snippets by replacing designated variables in the code template with corresponding attribute values from the entity in each entity-template pair;
    nesting each child code snippet within the designated child point of its parent's code snippet by matching the child code snippet's entity's parent selector with the corresponding parent code snippet's entity's identifier;
    ordering sibling code snippets according to their entity's designated order value; and
    forming a controlled computer program from the arranged code snippets.

19. The method of claim 18, wherein a plurality of initial entities comprises values comprising code snippets to be included in the formed computer program.

* * * * *